United States Patent [19]

Banzai et al.

[11] Patent Number: 4,968,867
[45] Date of Patent: Nov. 6, 1990

[54] WIRE ELECTRODE FOR WIRE CUT ELECTRIC DISCHARGE MACHINING

[75] Inventors: Masato Banzai; Yoshio Shibata, both of Nagoya, Japan

[73] Assignee: Mitsubishi Denki Kabushiki Kaisha, Tokyo, Japan

[21] Appl. No.: 307,950

[22] Filed: Feb. 9, 1989

[30] Foreign Application Priority Data

| Jun. 30, 1988 | [JP] | Japan | 63-163407 |
| Aug. 18, 1988 | [JP] | Japan | 63-205321 |
| Aug. 18, 1988 | [JP] | Japan | 63-205322 |
| Sep. 1, 1988 | [JP] | Japan | 63-219207 |

[51] Int. Cl.$^5$ .......................... B23H 1/06; B23H 7/08
[52] U.S. Cl. ................................................. 219/69.12
[58] Field of Search ............... 420/476, 477, 498, 502, 420/504, 506, 529, 531, 542, 544; 219/69.15

[56] References Cited

U.S. PATENT DOCUMENTS

| 4,287,404 | 9/1981 | Convers et al. | 219/69.12 |
| 4,341,939 | 7/1982 | Briffod et al. | 219/69.12 |
| 4,448,655 | 5/1984 | Inoue | 219/69.12 |
| 4,475,996 | 10/1984 | Inoue | 219/69.12 |
| 4,686,153 | 8/1987 | Tominaga et al. | 219/69.12 |

FOREIGN PATENT DOCUMENTS

| 57-89527 | 6/1982 | Japan | 219/69.12 |
| 156129 | 9/1982 | Japan | 219/69.12 |
| 58-59736 | 4/1983 | Japan | 219/69.12 |
| 59-50141 | 3/1984 | Japan | 219/69.12 |
| 60-94227 | 5/1985 | Japan | 219/69.12 |
| 136733 | 6/1986 | Japan | 219/69.12 |
| 293725 | 12/1986 | Japan | 219/69.12 |
| 645831 | 10/1984 | Switzerland | 219/69.12 |

OTHER PUBLICATIONS

Patent Abstracts of Japan, vol. 7, No. 227 (M-248) 1372, Oct. 7, 1983, 58-120,429.
Patent Abstracts of Japan, vol. 10, No. 304 (M-526) 2360, Oct. 16, 1986, 61-117,021.
Patent Abstracts of Japan, vol. 11, No. 266 (M-620) 2713, Aug. 28, 1987, 62-68227(A).
Patent Abstracts of Japan, vol. 11, No. 146 (M-587) 2593, May 13, 1987, 61-279,433.

*Primary Examiner*—A. D. Pellinen
*Assistant Examiner*—Geoffrey S. Evans
*Attorney, Agent, or Firm*—Oblon, Spivak, McClelland, Maier & Neustadt

[57] ABSTRACT

A wire electrode for wire cut electric discharge machining having a core wire of high thermal conductivity (made of copper, silver, aluminum or their alloys), an intermediate layer formed by a low-boiling point material (zinc), and an outermost layer of brass having high mechanical strength.

17 Claims, 10 Drawing Sheets

NO VIBRATIONS

VIBRATIONS

FORCE OF VIBRATIONS BY ELECTRIC DISCHARGES

SMALL ELASTIC CONSTANT

LARGE ELASTIC CONSTANT

(a) APPLICATION OF AN AMOUNT OF DEFORMATION d

(b) ATTENUATION-VIBRATION OF A WIRE ELECTRODE

| MATERIAL | TENSILE STRENGTH (kg/mm²) | ELEC. COND. (IACS% AT 20°C) |
|---|---|---|
| ELECTROLYTIC COPPER | 20 ~ 38 | 101 |
| 8/2 RED BRASS | 25 ~ 60 | 32 |
| 7/3 BRASS | 25 ~ 65 | 23 |
| 65/35 BRASS | 28 ~ 70 | 27 |
| Cu-Sn ALLOY | 22 ~ 45 | 92 |
| SOFT COPPER PLATE | 53 | 17 |

WIRE ELECTRODE FOR WIRE CUT ELECTRIC DISCHARGE MACHINING

The present invention relates to a wire electrode for wire cut electric discharge machining capable of realizing ultra-high speed processing.

A wire electrode used for a wire cut electric discharge apparatus is generally formed by a material such as copper, brass, tungsten or molybdenum into an enlongated form having a diameter ranging from 0.05 mm to 0.35 mm.

An Example of electric discharge machining with use of a wire electrode of this type will be described with reference to FIG. 1. A wire electrode 1 is placed opposing a workpiece 2 in a stretching state while the wire electrode 1 is moved at a constant speed in the direction of an arrow mark A. Then, a pulse voltage is applied across the wire electrode 1 and the workpiece 2. With the application of the pulse voltage, electric discharges occur in a minute gap formed between the wire electrode 1 and the workpiece 2 through a work liquid 3 as an electric discharged medium, and a part of the workpiece 2 is molten and scattered by a thermal energy when the electric discharges occur. In order to keep the minute gap to thereby effect continuously the electric discharges, there has been adopted a numerical control method to effect a relative movement of the wire electrode 1 to the workpiece 2 by means of an X-Y cross table (not shown). Thus, by continuing the electric discharges and by controlling the movement of the X-Y cross table, a machined groove 4 can be formed in a desired shape, and therefore, the wire cut electric discharging has widely been applied to the perforating and cutting of a metal mold.

In such machining apparatus, however, evaporation of the wire electrode 1 and the workpiece 2 and an explosive evaporation of the working liquid 3, when the electric discharges occur, cause vibrations at the wire electrode, whereby it vibrates between the upper and lower position determining guide pieces as supporting members in a form of half moon as shown in FIG. 2. As a result, the width 4 of the machined groove becomes large when such vibrations of the wire electrode occur (FIG. 3b). This causes reduction in accuracy of machining at the workpiece 2, and reduction in a speed of machining because an excessive machining is required. Further, since a large amount of current has to be supplied to the wire electrode in order to increase the machining speed, the wire electrode may be broken due to the generation of an internal heat. In view of the above, it has been considered that it is necessary for the wire capable of increasing a machining speed and machining accuracy to have both properties of a strong mechanical strength and good electric conductivity. However, it has been found as shown in FIG. 19 that metallic materials having a high mechanical strength generally show a low electric conductivity, whereas those having a high electric conductivity generally show a low mechanical strength. Namely, it is difficult that the metallic materials can satisfy the above-mentioned properties. In view of the above-mentioned difficulty, the electrodes as described below have been proposed.

One of the proposed electrodes is not of a single structure having a single wire but is of a composite structure in which the structural elements perform their inherent function. Namely, as a compromise proposal, an electrode is produced in such a manner that a material having good electric conductivity is coated on a core wire having a large mechanical strength, and an alloy including a low-boiling point material as the major component and for facilitating electric discharge machining is coated on the material having good electric conductivity.

As another proposal, there is an electrode strucutre in which an alloy including a low-boiling point material as the major component is coated on a core wire such as a copper alloy having good electric conductivity. The proposed electrode structure is produced regarding the electric conductivity as of importance even though the mechanical strength is somewhat poor. Further, it aims at improving a machining speed by rapidly melting a metallic bridge, formed between the electrode and the workpiece at the time of electric discharging, by heat of a short-circuiting current.

Thus, in the conventional wire electrode for wire cut electric discharge machining, it has been considered to be necessary that the electrode is in a composite structure in which the structural elements perform their inherent function in order to satisfy various requirements.

However, the conventional wire electrodes have some disadvantages. Namely, in the electrode having a three-layered structure, there easily causes the wearing of an alloy including a low-boiling point material as the major component which constitutes the outermost layer due to heat at the time of electric discharge machining. Further, since the electrode uses a material having a high mechanical strength as a core wire and such material is generally low in electric conductivity, it is difficult to effectively transfer heat generated between discharging electrodes to the area behind the wire electrode, which is cooled by the working liquid. Namely, as shown in FIG. 4, the heat at the surface area of the workpiece can be escaped through the wire electrode on the opposite side of the electrode cooled by the working liquid due to the temperature difference (T-To) between a temperature T° C. at the surface area of the workpiece where the electric discharges occur and a temperature To° C. of cooling liquid. In other words, since a heat stream stagnates at the boundary region between the surface area of the workpiece and the core wire, the wearing of the surface area is accelerated due to temperature rise, whereby the good electric conductive material which constitutes the intermediate layer is easily exposed. As a result, the electric discharge machining becomes unstable and the wire electrode is easily broken due to a reduced surface area in cross section of the wire. Thus, the electrode has the disadvantage that the wearing of the surface area is too large to maintain good electric discharge machining condition when a current is increased in order to effect the electric discharge machining at a high speed.

In the case of the electrode having a double-layered structure which considers electric conductivity to be important, it is difficult to apply a high tension to the electrode because the mechanical strength of it is low. Accordingly, the amplitude of vibrations is large at the time of electric discharge machining, whereby the machining becomes unstable and the breaking of the electrode are often caused due to an increased amount of stress. Further, the vibrations of the electrode cause an excessive amount of machining of the workpiece, and therefore, a speed of machining is reduced. In addition, since the coating layer includes a low-boiling point material as the major component, it is easily worn by heat during electric discharge machining to thereby cause the explosure of the core wire, whereby the machining operation becomes unstable.

It is, therefore, an object of the present invention to provide a wire electrode for electric discharge machining capable of suppressing the excessive wearing of a coating layer and of effecting a high speed machining to thereby improving accuracy in machining.

The foregoing and other objects of the present invention have been attained by providng a wire electrode for a wire cut electric discharge apparatus for effecting electric discharge machining in which a work liquid is supplied to a small gap between the wire electrode and a workpiece, and the wire electrode is constituted by a core wire and a core wire coating layer formed on the core wire, characterized in that the wire electrode is elongated by a wire drawing process and the core wire is formed by a material having higher thermal conductivity than the core wire coating layer, the core wire being formed by a material having a high mechanical strength.

Preferred embodiments of the wire electrode according to the present invention will be described with reference to the drawings.

Figure 5:
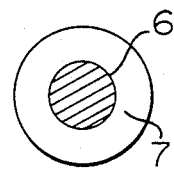
FIG. 5 is a diagram showing a construction of electrode according to a first embodiment of the present invention.
Figure 6:
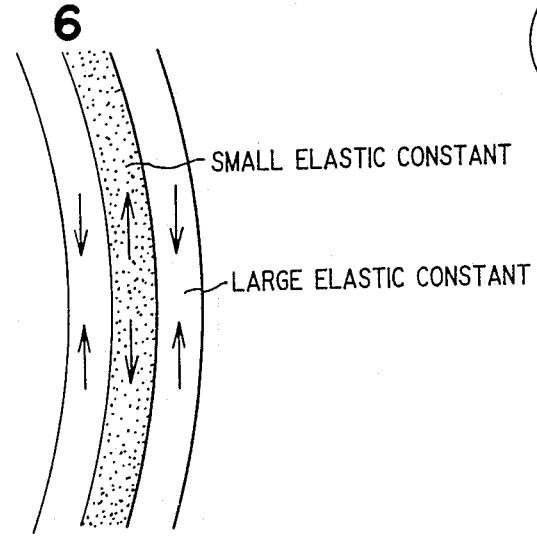

FIG. 5 is a cross-sectional view of a first embodiment of the wire electrode of the present invention. A core wire 6 is covered by a core wire coating layer 7. The wire electrode is formed by inserting a wire material having a diameter of 3 mm into a tubular material having a diameter of 8 mm and a wall thickness of 0.6 mm, repeating several times the steps of enlogating, annealing and washing with an acid to thereby reduce the diameter of the electrode to 0.3 mm and then, by annealing it at a low temperature to thereby remove strains. In this embodiment, brass containing 35 wt % of Zn (which corresponds to JISC 2680) is used for the core wire coating layer and a Cu-Sn alloy including 0.15 wt % of Sn balanced by Cu is used for the core wire. Besides the brass, a Cu alloy containing Cu as the main component and less than 50 wt % of Mg and/or Cd may be used for the core wire coating layer. In the wire electrode shown in FIG. 5, the thickness of the core wire coating layer is about 0.066 mm.

Figure 1:
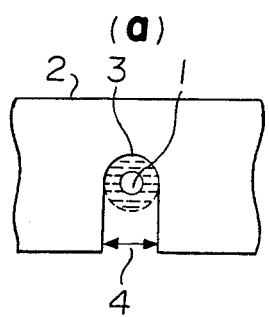
FIGS. 1a and 1b are diagrams for illustrating how wire cut electric discharge machining is effected.
Figure 1:
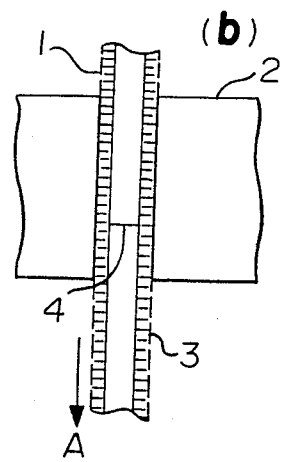
Figure 2:
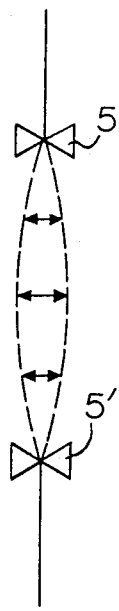
FIG. 2 is a diagram showing how a wire electrode is vibrated by a force of vibration.
Figure 3:
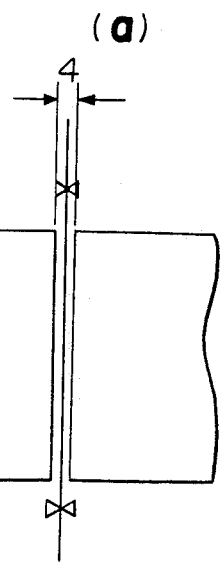
FIGS. 3a and 3b are diagrams illustrating how the width of a machined groove is changed due to the vibrations of the wire electrode.
Figure 3:
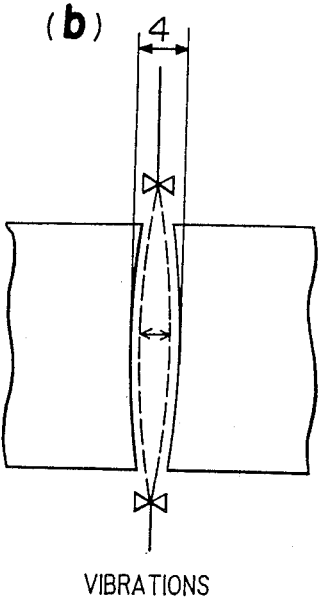
Figure 4:
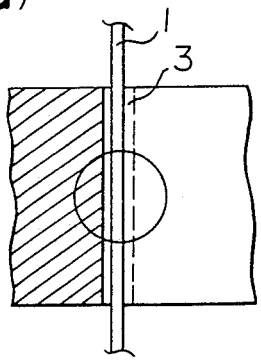
FIGS. 4a and 4b are diagrams showing how heat generated by electric discharges is transferred to the portion opposite a wire electrode which is cooled by a work liquid through the wire electrode.
Figure 4:
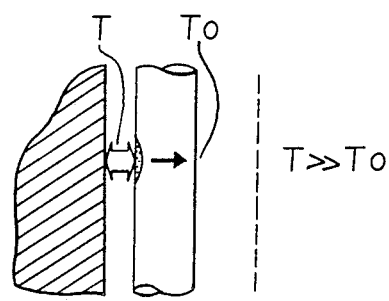
Figure 6:
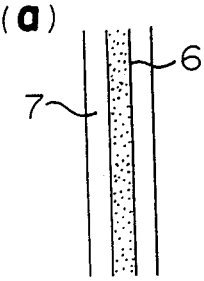
FIGS. 6a through 6c are diagrams illustrating how the electrode of the first embodiment of the present invention is deformed owing to forces produced in the electrode.
Figure 6:
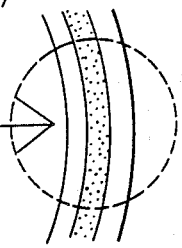

The elastic constant of the core wire is different from that of the core wire coating layer. In other words, when forces of vibrations are applied to the wire electrode, there produce internal stresses in the core wire and the coating layer in the opposite directions as illustrated in FIG. 6c to thereby suppress the defromation of the wire electrode, and an energy of vibrations can be absorbed in the boundary layer of the coating layer and the core wire, so that an extremely high vibration-damping ability can be obtained. Accordingly, the wire electrode can suppress the vibrations of the wire during the electric discharge machining. Since a tension is not increased at the electrode, the stresses to the electrode can be extremely reduced to thereby reduce possibilities of the breaking of the electrode.

Figure 7:
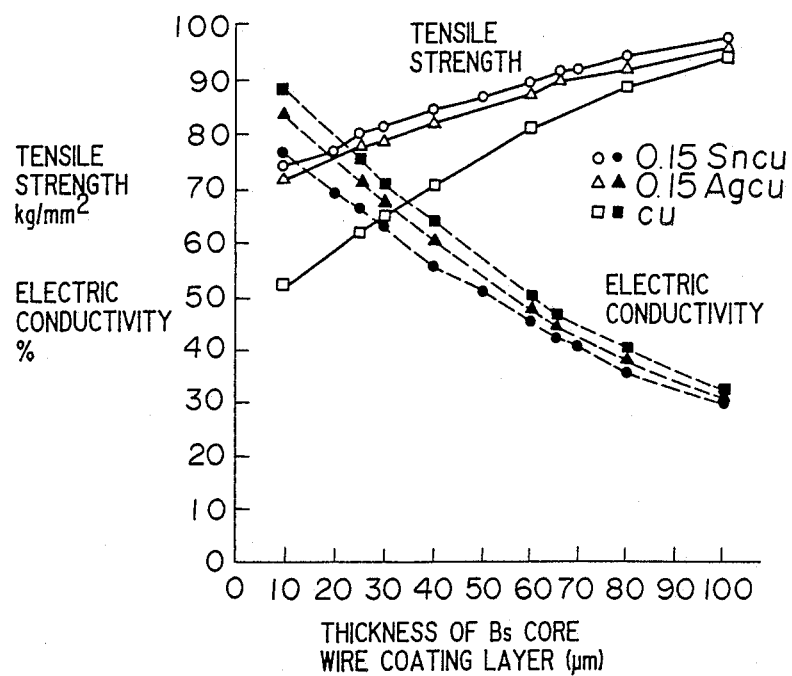
FIG. 7 is a diagram showing a relation of the tensile strength and electric conductivity of the electrode to the thickness of a core wire coating layer.

FIG. 7 shows characteristics of mechanical strength and electric conductivity of the wire electrode according to the first embodiment of the present invention (in FIG. 7, there are also illustrated the characteristics of other wire electrodes wherein copper or a copper alloy including Ag is used for the core wire). Since the strength of the material for the coating layer is high, the tensile strength is large as the thickness of the coating layer is large. Particularly, the tensile strength of the wire electrode is as much as about 90 kg/mm$^2$ while the electric conductivity is as 40%, which could not be obtained in the conventional wire electrodes.

Figure 8:
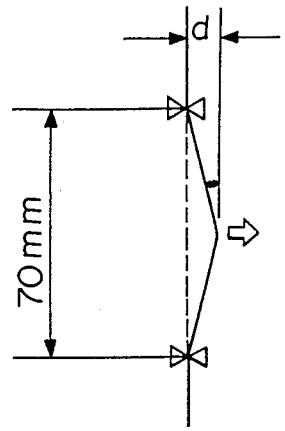
FIGS. 8a and 8b are diagrams showing a method of measuring the vibration-damping properties of the wire electrode as shown in FIG. 5.
Figure 8:
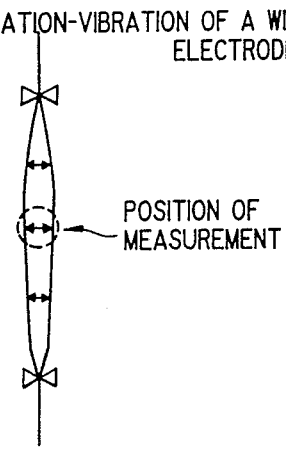
Figure 9:
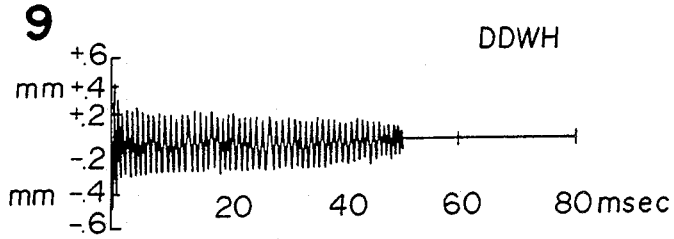
FIGS. 9a through 9d are diagrams showing results obtained by measuring the vibration-damping properties by the method as illustrated in FIG. 8.
Figure 9:
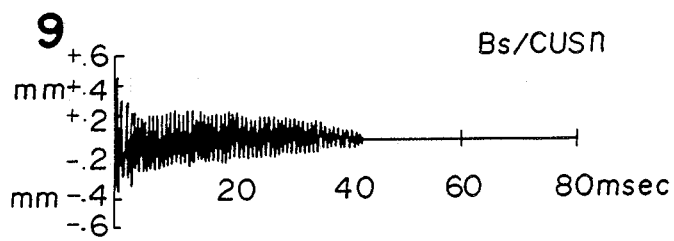
Figure 9:
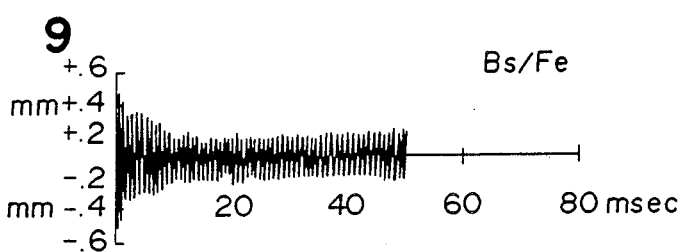
Figure 9:
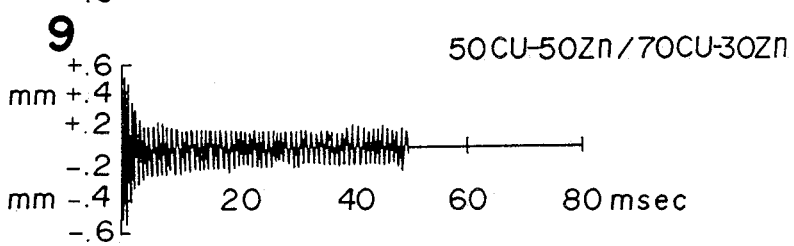

The amplitude of vibrations on four kinds of wire electrodes: a conventional electrode having the core wire of brass, the electrode of the present invention as shown in FIG. 5, a composite electrode having a core wire made of iron having a high strength on which a coating layer of brass is coated, and a composite electrode having a core wire of 70 Cu-30 Zn on which a coating layer of a 50 Cu-50 Zn alloy is coated, is measured under conditions that the wire electrodes are respectively supported by guide pieces vertically arranged with a span of about 70 mm while the wire electrode is fed at a constant speed and then, a certain amount of displacement is given to the wire electrode at its central portion between the guide pieces, as shown in FIG. 8. A result of the measurement is shown in FIGS. 9a–9d. In FIG. 9, the ordinate represents the displacement (mm) of the wire electrode and the abscissa represents time (msec). In accordance with FIGS. 9a–9d, the amplitude of the vibrations of the electrode according to the present invention is distinctly attenuated in a time of 40 msec from the application of a force for displacement to the electrode, whereas for the other three kinds of electrodes, there appears no distinct attenuation by the time of 40 msec. Accordingly, it is found that the electrode of the present invention is superior to the others with respect to "vibration-damping effect".

Figure 10:
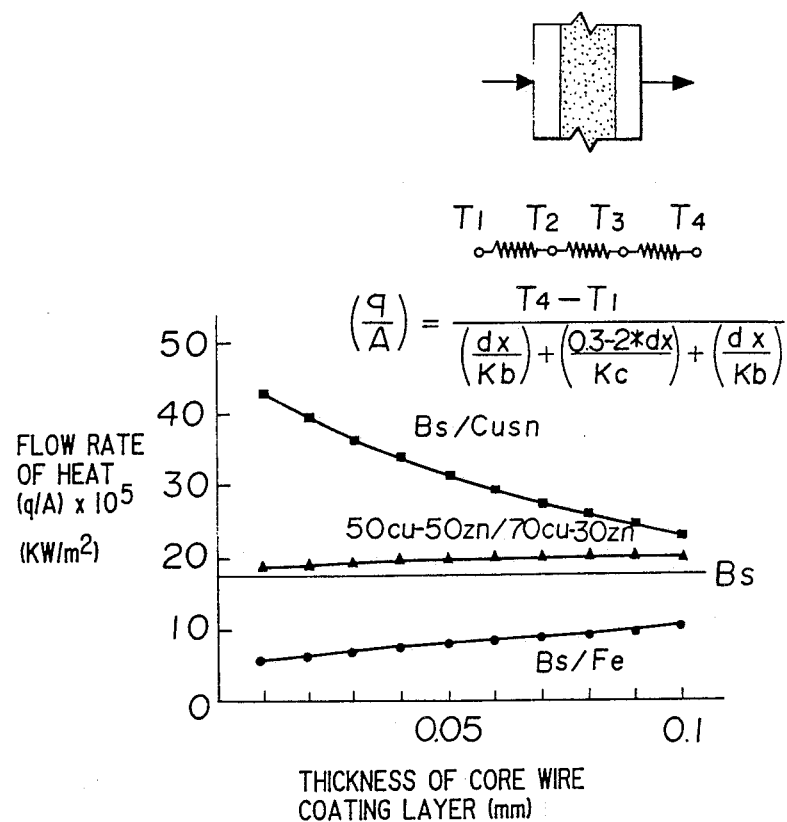
FIG. 10 is a diagram showing a result of the calculation of calorie per unit surface area of wire electrodes in assumption that the heat transferring ability of the wire electrodes is in a form of one-dimensional stationary heat transferring model.

FIG. 10 is a diagram showing that the wire electrode of the type as shown in FIGS. 9a–9d can be considered to be a one dimensional stationary heat transferring model, and values obtained by calculation of the flow rate of heat for each of the wire electrodes are plotted, the flow rate of heat corresponding to a quantity of heat, generated between discharge electrodes, transferred to the cooled portion in the rear of the wire electrode, wherein the temperature of the heat generating portion is 400° C. and the portion cooled by a working liquid is 20° C. In FIG. 10, the ordinate represents the flow rate of heat per unit surface area ($kw/m^2$), and the abscissa represents the thickness of the core wire coating layer (mm). FIG. 10 clearly shows that the value of the flow rate of heat (about $2.8 \times 10^5$ $kw/m^2$) of the first embodiment of the present invention is the greatest among those of the other wire electrodes although the values vary more or less dependent on the thickness of the coating layer. Thus, the heat transferring function of the wire electrode of the first embodiment of the present invention is excellent.

Figure 11:
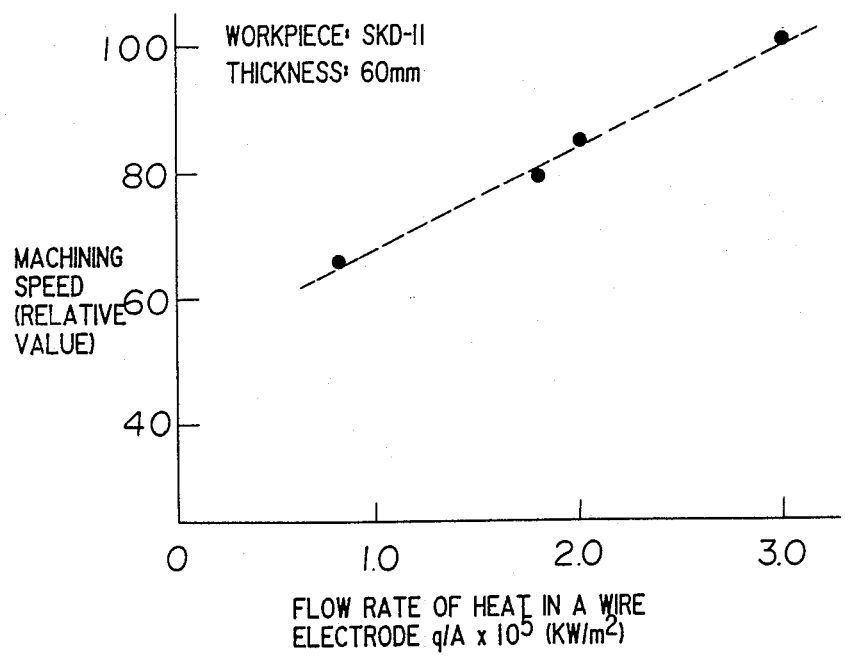
FIG. 11 is a diagram showing the relation between the heat transferring ability obtained by calculation and the actual maximum machining speed.

FIG. 11 shows maximum working speeds obtained when a workpiece is cut along a linear line by using the wire electrodes which are mentioned with respect to FIGS. 9a through 9d. In FIG. 11, the ordinate represents the speed of machining (the scale is relative value when the speed of the wire electrode of the present invention is considered to be 100), and the abscissa represents the flow rate of heat obtained by calculation. The material of the workpiece used is SKD-11 (1.40–1.60 wt % of C, less than 0.60 wt % of Mn, less than 0.030 wt % of S, 0.80–1.20 wt % of Mo, less than 0.40 wt % of Si, less than 0.030 wt % of P, 11.00–13.00 wt % of Cr, 0.20–0.50 wt % of V and balanced by Fe) and the thickness is 60 mm. The diameter of each of the wire electrodes is 0.3 mm. FIG. 11 clearly shows that the machining speed by using the wire electrode of the first embodiment of the present invention is the greatest, and there is clear interrelationship between the flow rate of heat and the machining speed. In other words, the greater the flow rate of heat is, the higher the machining speed is.

The same effect as described with reference to FIGS. 7–11 can be obtained by using a wire electrode having a core wire of a Cu-Ag alloy. A wire electrode having the core wire made of pure copper improves electric conductivity, thermal conductivity and vibration-damping properties whereby good result is obtainable with respect to machining speed although the mechanical strength is more or less reduced. Besides the core wire of the pure copper, use of a core wire made of silver or aluminum or an alloy including silver or aluminum as the major component provides the same effect as in the case of the core wire of the Cu-Sn alloy.

The coating layer formed by brass having 30 wt % 40 wt % of Zn facilitates a cold-drawing method and machining operations to thereby improve the mechanical strength. Further, there is no risk of excessive wearing because the content of Zn as the low-boiling point material is small.

In the wire electrode of the present invention, a high machining speed can be respectively obtained by using a discharge current of the waveform having a high peak value and a short pulse width. It is because in the current waveform having short pulses, a state of insulation between discharge electrodes caused immediately after an electric discharge can be restored in a short time, whereby the intervals of the electric dicharges can be shortened. However, since energy at one electric discharging cycle is reduced, if the peak value can be made high, the total energy can be increased and an increased machining speed can be expected. However, there is a tendency that when the peak value is high, a repulsive force caused by electric discharges and a thermal shock is large to thereby cause the breaking of a wire electrode. Accordingly, when the wire electrode of the conventional type was used, it was impossible to obtain the effect of improvement of the current waveform. The wire electrode of the first embodiment of the present invention enables to obtain such effect and to remarkably improve the machining speed since the electrode has a large resistance to the breaking of the wire.

Thus, in accordance with the wire electrode of the present invention formed by inserting the core wire having a high mechanical strength into a tubular coating material having good heat conductivity followed by subjecting it to a drawing operation, the following effects are obtainable.

(1) Vibration-damping effect

Since the elastic constant of the core wire is different from that of the coating material, energy can be absorbed at the boundary region between them to thereby perform excellent vibration-damping function. As a result, stable, accurate machining operations can be obtained at a high speed.

(2) Heat transferring effect

Since the thermal conductivity of the core wire is high, heat produced by electric discharges can be effectively transferred, whereby the speed of wearing of the coating layer can be slow.

(3) Resistance to the breaking of the wire electrode

Owing to the above-mentioned (1) and (2), a stress to the electrode can be reduced, and a time of reduction in strength due to developed heat can be prolonged. The synergistic effect by the above-mentioned (1) and (2) reduces possibilities of the breaking of the wire electrode. As a result, an average current supplied to the wire electrode can be increased to thereby increase the machining speed.

(4) Current waveform improving effect

Since the wire electrode of the present invention is effective to reduce an electric resistance, reduction in resistance in an electric discharging circuit can be realized, whereby a current waveform having a high peak value is obtainable.

As a second embodiment of the present invention, a wire electrode in a composite form is obtainable by determining the thickness of the coating layer so that the cross-sectional area of the coating layer to the entire cross-sectional area of the wire electrode of the first embodiment of the present invention is in a range of 50%–90%. In this case, a composite wire electrode having the coating layer whose strength is greater than that of the core wire is obtainable.

When the thickness of the coating layer is too small, the characteristics of a raw material for the coating layer in which the strength can be improved by subjecting it to machining operations can not be obtained, and the strength of the core wire which is difficult to expect improving the strength by the machining operations is greatly effected, whereby the strength of the wire electrode itself is reduced. Accordingly, a composite wire electrode having the coating layer whose strength is higher than the core wire is obtainable by determining the cross-sectional surface area of the coating layer being greater than that of the core wire.

The mechanical strength and electric conductivity of the wire electrode of the second embodiment are shown in FIG. 7 which is used for the wire electrode of the first embodiment of the present invention (the physical properties of wire electrodes having a core wire made of Cu or a Cu-Ag alloy are also shown). In this embodiment, the tensile strength is large as the thickness of the coating layer is layer. In the wire electrode having a diameter of 0.3 mm, when the thickness of the coating layer is 0.044 mm or greater, the proportion of the cross-sectional area of the coating layer exceeds 50%. In the second embodiment, the diameter of the wire electrode is 0.3 mm, and the thickness of the core wire coating layer is about 0.066 mm. Then, the cross-sectional area of the coating layer to the total cross sectional area of the wire electrode is about 69%.

In the second embodiment, the same effect as described with respect to the vibration-damping and the heat transferring in the first embodiment can be obtained in addition to the above-mentioned effect.

Figure 12:
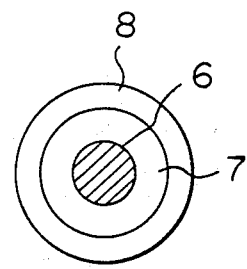
FIG. 12 is a cross-sectional view showing a construction of wire electrode according to a third embodiment of the present invention.

FIG. 12 is a cross-sectional view of a third embodiment of the wire electrode according to the present invention, wherein the same reference numerals designate the same or corresponding parts. In the third embodiment, the core wire 6 is covered by a core wire coating layer 7 which is in turn covered by an outermost layer 8.

The wire electrode of the third embodiment is prepared as follows. A linear material having a diameter of 3 mm is inserted in a tubular material having a diameter of 8 mm and a wall thickness of 0.6 mm; a series of steps of elongating, annealing and washing with an acid is repeated several times so that the outer diameter is reduced to 0.28 mm; the outer surface of the elongated product is subjected to plating operations so that the outer diameter of it becomes 0.3 mm; and annealing is conducted at a low temperature to remove strains. For the wire electrode, a 65/35 brass is used for the core wire coating layer, a Cu alloy including 0.15 wt % of Sn balanced by copper is used for the core wire, and Zn is used for the outermost layer. The thickness of the outermost layer is about 0.010 mm and the intermediate layer as the core wire coating layer is about 0.055 mm.

The third embodiment of the present invention provides the same function and effect as those described with reference to FIGS. 6 through 11 for the first embodiment. In addition, the outermost layer of the third embodiment is formed by a metallic material including Zn, Cd or Mg as the major component which is a low-boiling point material. Accordingly, the machining speed can be improved because a large explosive force is obtained when the electric dicharges occur, and possibilities of the breaking of the wire electrode can be reduced because heat is prevented from entering in the electrode due to latent heat on evaporating.

Figure 13:
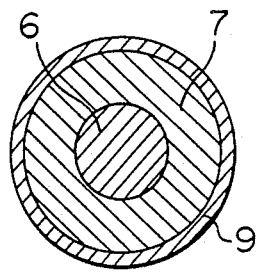
FIG. 13 is a cross-sectional view showing a fourth embodiment of the wire electrode according to the present invention.

FIG. 13 is a cross-sectional view of a fourth embodiment of the wire electrode of the present invention. The wire electrode is constituted by a core wire 6 made of a material having high thermal conductivity, a core wire coating layer 7 made of a material having a high mechanical strength which is coated on the core wire 6 and an outermost layer 9 which is an oxide film coated on the coating layer 7.

The method of preparing the wire electrode is the same as that of the third embodiment except that the outer surface is positively oxidized in an oxidized atmosphere at the time of annealing at the final stage. The thickness of the outermost layer 9 after manufacturing steps have been completed is about 0.05 $\mu$m and the thickness of the core wire coating layer 7 is about 0.066 mm.

Figure 16:
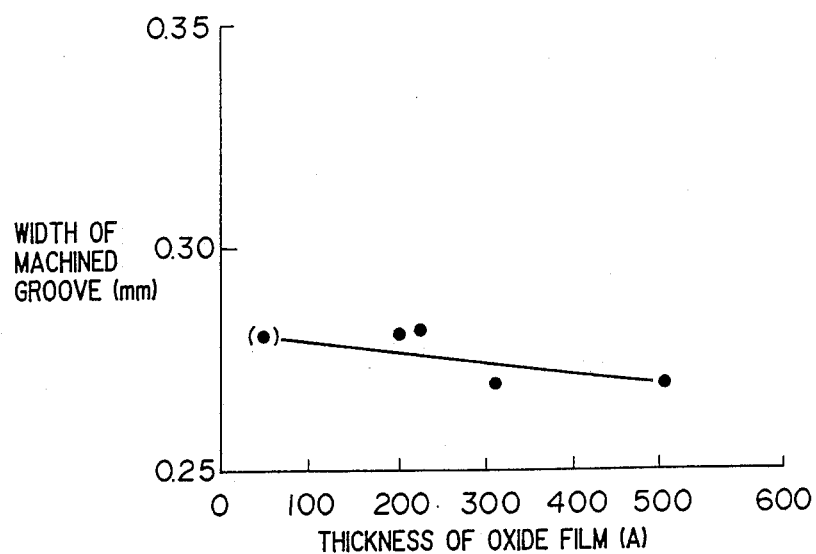
FIGS. 16 and 17 are respectively diagrams showing an effect obtained by coating an oxide film on the wire electrode according to the fourth embodiment of the present invention.
Figure 17:
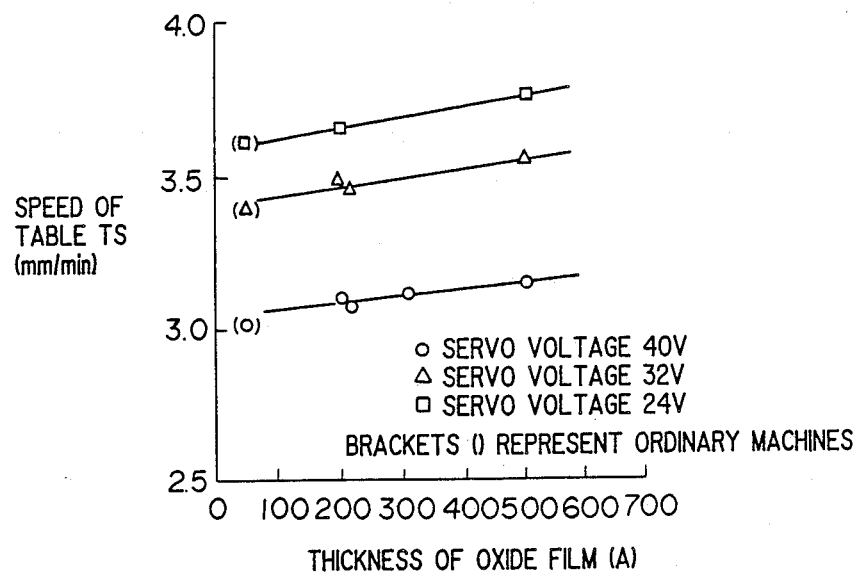

In the fourth embodiment of the present invention, the same function and effect as those of the first embodiment are obtainable. Further, needless electric discharges at the lateral side of the wire electrode can be reduced because the oxide layer is formed on the surface of the wire electrode. This realizes a narrow width of the machined groove as shown in FIG. 16. As a result, the machining speed can be increased to thereby improve efficiency of electric discharge machining as shown in FIG. 17.

Figure 14:
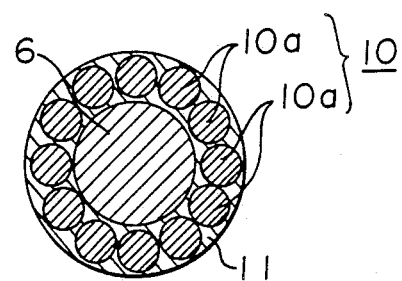
FIG. 14 is a cross-sectional view showing a fifth embodiment of the wire electrode of the present invention.

FIG. 14 is a cross-sectional view of a fifth embodiment of the wire electrode according to the present invention. The wire electrode is constituted by a core wire 6 of a Cu alloy having a high thermal conductivity (which may be the same as that shown in FIG. 13), a core wire coating layer 10 coated on the core wire 6, the coating layer being formed by twisting thin wires of brass having a high mechanical strength, and an outermost layer 11 formed by Zn as a low-boiling point material or a Zn alloy including Zn as the major component, on the core wire coating layer 10.

The method of preparing the wire electrode of the fifth embodiment will be described.

A plurality of thin wires of brass each having a diameter of 0.8 mm are twisted around the circumference of a linear material of a Cu alloy having a diameter of 3 mm; a Zn layer having a thickness of about 0.1 mm is formed on the twisted product by a plating method; the thus obtained product is subjected to a series of steps of elongating, annealing and washing with an acid several times to thereby reduce its diameter to 0.3 mm; and finally, annealing is conducted at a low temperature to remove strains. For the core wire 6, the Cu alloy including 0.15 wt % of Sn balanced by copper is used in the same manner as described with reference to FIG. 13. The thickness of the outermost layer (zinc film) is about 0.01 mm and the thickness of the core wire coating layer (the intermediate layer made of brass) is about 0.07 mm.

The characteristics of vibration-damping, heat transferring, resistance to the breaking of wire and improving of a current waveform in the fifth embodiment of the present invention were confirmed to be substantially the same as those in the first embodiment as a result of experiments.

It was also confirmed in the fifth embodiment of the present invention that the electric discharge characteristic can be increased to thereby realize uniform electric discharges so that the surface roughness of a workpiece can be improved because the coating layer as the intermediate layer having a high mechanical strength is covered by a low-boiling point material.

In the fifth embodiment, although zinc is used for the outermost layer as a low-boiling point material, it may be replaced by another low-boiling point material such as magnesium, a magnesium alloy including magnesium as the major component, cadmium or a cadmium alloy including cadmium as the major component. In these cases, the same function and effect as described before can be obtained.

Figure 15:
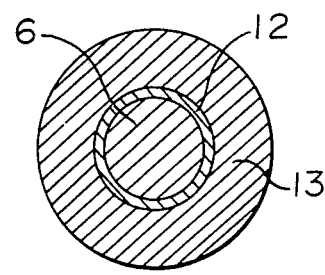
FIG. 15 is a cross-sectional view of a sixth embodiment the wire electrode of the present invention.

FIG. 15 is a cross-sectional view of a sixth embodiment of the wire electrode of the present invention. The wire electrode comprises a core wire 6 formed by a Cu alloy having the same high thermal conductivity as that shown in FIG. 13, a core wire coating layer 12 on the circumferential surface of the core wire by plating a material of Zn as a low-boiling point material, and an outermost layer 13 formed by brass having a high mechanical strength which is formed on the core wire coating layer 12.

The wire electrode of the sixth embodiment is prepared as follows.

A linear material made of a Cu alloy including 0.15 wt % of Sn balanced by Cu is subjected to the plating of zinc (by which the core wire coating layer is formed) to obtain the core wire 6 having a diameter of 3 mm; the core wire 6 is inserted into a tubular material formed by a 65/35 brass (which constitutes the outermost layer 13) having a diameter 8 mm and a wall thickness of 0.6 mm; the thus obtained double-layered product is subjected to a series of steps of elongating, annealing and washing with an acid several times to thereby reduce its outer diameter to 0.3 mm; and a low-temperature annealing is conducted to remove strains. After the completion of the manufacturing steps, the thickness of the outermost layer 13 is about 0.066 mm and the thickness of the core wire coating layer 12 is about 0.005 mm.

The wire electrode of the sixth embodiment provides substantially the same characteristics of vibration-damping, thermal conductivity, resistance to the breaking of wire and an improvement of the current waveform as that of the first embodiment as a result of experiments.

It is confirmed in the sixth embodiment that since the core wire coating layer 12 is formed by a thin Zn layer, zinc diffuses into the outermost layer 13 and the core wire 6 which include a brass component by annealing during the manufacture of the wire electrode, whereby a degree of close-fitness between the adjacent layers can be increased to thereby improve the yield of products manufactured.

Figures 18, 19:
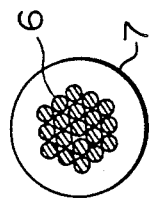
FIG. 18 is a cross-sectional view of a seventh embodiment of the present invention.
FIG. 19 is a diagram showing the mechanical strength and thermal conductivity of some kinds of metallic materials.

FIG. 18 is a cross-sectional view of a seventh embodiment of the wire electrode in which a core wire 6 is coated by a core wire coating layer 7. The core wire 6 is formed by twisting a plurality of linear elements having a diameter of 0.05 mm so that the outer diameter of the twisted body is about 3 mm; the twisted body is inserted into a tubular material having the outer diameter of 8 mm and a wall thickness of 0.6 mm; the double layered body is subjected to a series of steps of elongating, annealing and washing with an acid several times to thereby reduce its outer diameter to 0.3 mm; and a low-temperature annealing method is conducted to remove strains.

In the seventh embodiment, brass having 35 wt % of Zn is used for the coating layer, and a Cu alloy including 0.15 wt % of Sn balanced by Cu is used for the core wire. The thickness of the coating layer is about 0.066 mm.

In the seventh embodiment, at least one piano wire may be incorporated in the twisted linear elements to improve the mechanical strength of the core wire so that performance of the electrode can be further improved.

In this embodiment, a thin alloy layer including Zn, Cd or Mg as the major component may be coated on the core wire coating layer so as to further increase effect as a wire electrode.

In the seventh embodiment, the same function and effect as those of the first embodiment can be obtained.

We claim:

1. A wire electrode for wire cut electric discharge apparatus for effecting electric discharge machining in which a work liquid is supplied to a small gap between the wire electrode and a workpiece, and said wire electrode is constituted by a core wire and a core wire coating layer formed on said core wire, characterized in that said wire electrode is elongated by a wire drawing process, said core wire coating layer is formed by brass having a high mechanical strength, and said core wire is formed by a material having higher thermal conductivity than said core wire coating layer, wherein said wire electrode constituted by said core wire and core wire coating layer is an integrally drawn product, the cross-sectional area of the core wire coating layer to the total cross-sectional area of the wire electrode being in the range of 50–90%.

2. The wire electrode according to claim 1 wherein said brass includes zinc in a range of from 30 wt % to 40%.

3. The wire electrode according to claim 1, wherein an outermost layer made of a metal having good electric discharge properties is formed on said core wire coating layer.

4. The wire electrode according to claim 1, wherein an outermost layer of an oxide film is formed on said core wire coating layer.

5. The wire electrode according to claim 1, wherein said core wire coating layer comprises a plurality of thin 6. The wire electrode according to claim 1, wherein said core wire comprises a plurality of twisted thin wires.

7. The wire electrode according to claim 4 or 5, wherein said outermost layer formed on said core wire coating layer is a thin layer of an alloy containing Zn, Cd or Mg as the major component.

8. The wire electrode according to claim 6, wherein said core wire includes at least one piano wire.

9. The wire electrode according to claim 1, wherein said core wire is formed by copper or a copper alloy.

10. The wire electrode according to claim 1, wherein said core wire is formed by silver or a silver alloy.

11. The wire electrode according to claim 1, wherein said core wire is formed by aluminum or an aluminum alloy.

12. The wire electrode according to claim 3, wherein said outermost layer is formed by magnesium or a magnesium alloy.

13. The wire electrode according to claim 3, wherein said outermost layer is formed by zinc or a zinc alloy.

14. The wire electrode according to claim 3, wherein said outermost layer is formed by cadmium or a cadmium alloy.

15. A wire electrode for a wire cut electric discharge apparatus for effecting electric discharge machining in which a work liquid is supplied to a small gap between the wire electrode and a workpiece, characterized in that said wire electrode comprises a core wire formed by a material having a high thermal conductivity, an intermediate layer formed by a low-boiling point material which is formed on said core wire and an outermost layer formed by brass having a high mechanical strength which is formed on said intermediate layer.

16. The wire electrode according to claim 15, wherein said core wire is formed by a material selected from a group consisting of copper, copper alloys, silver, silver alloys, aluminum and aluminum alloys.

17. The wire electrode according to claim 15, wherein said intermediate layer is a thin layer of zinc.

* * * * *

UNITED STATES PATENT AND TRADEMARK OFFICE
CERTIFICATE OF CORRECTION

PATENT NO. : 4,968,867
DATED : November 6, 1990
INVENTOR(S) : MASATO BANZAI ET AL.

It is certified that error appears in the above-identified patent and that said Letters Patent is hereby corrected as shown below:

On the title page:

In the Foreign Application Priority Data, please insert --Dec. 13, 1988  Japan ...............63-312940--.

Signed and Sealed this

Seventh Day of April, 1992

Attest:

HARRY F. MANBECK, JR.

*Attesting Officer*  *Commissioner of Patents and Trademarks*